United States Patent [19]
Hyslop

[11] 3,966,021
[45] June 29, 1976

[54] AIR LINE LUBRICATORS AND THE LIKE

[75] Inventor: Ian Willoughby Hyslop, Johannesburg, South Africa

[73] Assignee: West Rand Engineering Works (Proprietary) Ltd., Drugersdorp, Transvaal, South Africa

[22] Filed: Feb. 28, 1974

[21] Appl. No.: 447,122

[52] U.S. Cl. .............................. 184/56 R; 222/391
[51] Int. Cl.² ......................................... F16N 7/32
[58] Field of Search .............. 184/55 A, 55 R, 6.26, 184/105 R, 105 A, 29, 39, 53, 54, 56 R, 56 A, 98, 99, 100, 80, 88, 6.14, 6.21, 6.23; 239/322; 81/8.1; 222/546, 547, 522, 525, 402.18, 325, 326, 327

[56] References Cited
UNITED STATES PATENTS

| | | | |
|---|---|---|---|
| 2,364,894 | 12/1944 | Finch | 184/55 A |
| 2,512,178 | 6/1950 | Sherbondy | 222/327 |
| 2,602,571 | 7/1952 | Sherbondy | 222/327 |
| 2,646,906 | 7/1953 | Jones et al. | 222/391 |
| 2,821,332 | 1/1958 | Sherbondy | 222/325 X |
| 2,833,444 | 5/1958 | Sherbondy | 222/326 X |
| 3,040,835 | 6/1962 | Ahnert | 184/55 A |
| 3,069,053 | 12/1962 | Nilsson | 222/391 |
| 3,724,601 | 4/1973 | Scragg | 184/56 A |

FOREIGN PATENTS OR APPLICATIONS

| | | | |
|---|---|---|---|
| 451,583 | 8/1936 | United Kingdom | 222/326 |
| 825,409 | 12/1959 | United Kingdom | 222/325 |

*Primary Examiner*—Richard C. Pinkham
*Assistant Examiner*—Arnold W. Kramer
*Attorney, Agent, or Firm*—Irvin A. Lavine

[57] ABSTRACT

An air line lubricator comprises a casing having an axially disposed air inlet and outlet, the casing defining a chamber adapted to receive a removable cartridge for a lubricant in such manner that the cartridge is spaced from the inner walls of the chamber to define an air passage between the cartridge and such inner walls, the air passage communicating between inlet and outlet. The cartridge is provided with a discharge port at one end thereof and a piston movable therein towards the other end. In use air entering the casing inlet impinges on the piston to cause the latter to urge lubricant through the discharge port. Discharged lubricant is entrained by air passing through the casing outlet.

2 Claims, 1 Drawing Figure

U.S. Patent June 29, 1976 3,966,021
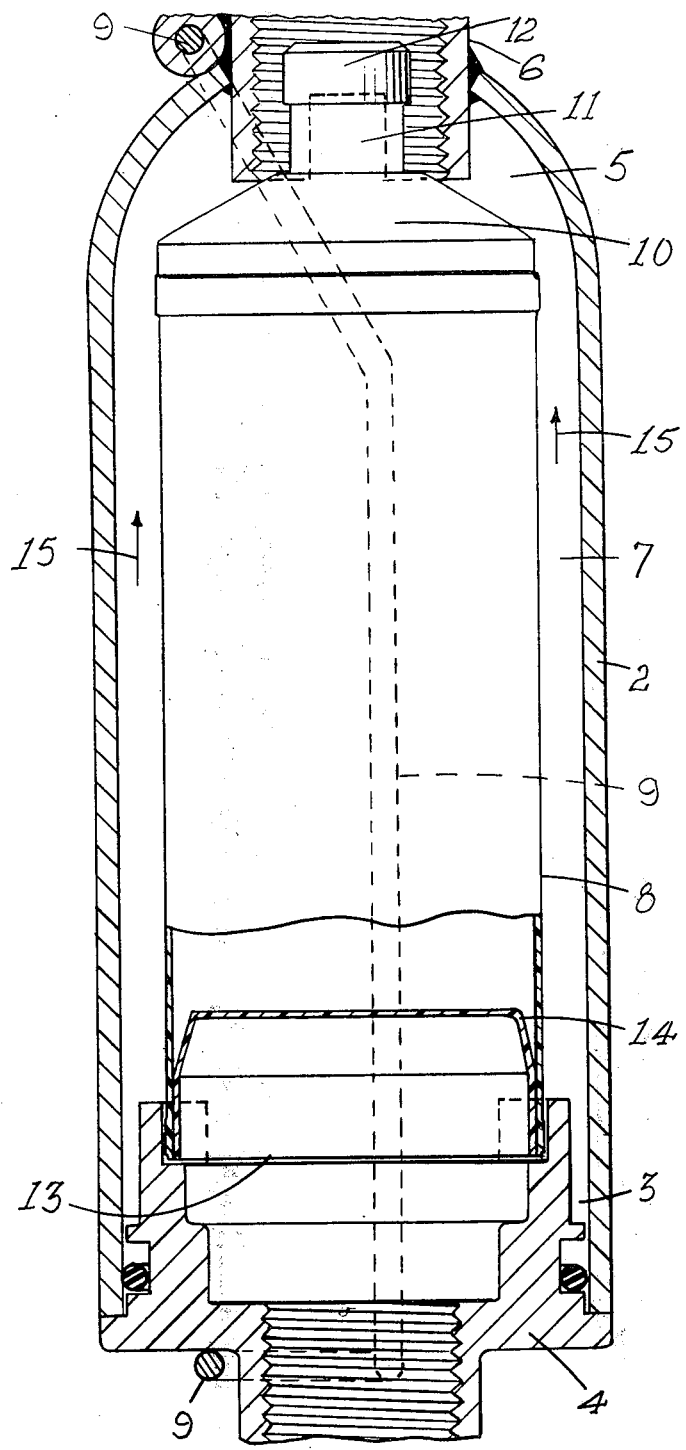

AIR LINE LUBRICATORS AND THE LIKE

This invention relates to air line lubricators, by which is meant a device adapted to be inserted in a line carrying pressure air or the like and which acts directly or indirectly to eject quantities of lubricant into the air stream.

Air line lubricators are known in respect of both oil and grease arrangements and an object of the present invention is the provision of a device primarily intended for the purpose of dosing a fluid line with grease. However, the apparatus could doubtless have utility in general dosing arrangements involving a viscous dosant.

According to the present invention a dosing device primarily intended for use as an air line lubricator, includes a casing defining a chamber, an inlet to the chamber and an outlet therefrom, the inlet and outlet being adapted for coupling into a line for pressure air or the like, a reservoir for a viscous material aligned in the chamber with piston means directed into the stream of pressure air when flowing through the device, means to enable the stream to impinge on the piston to cause movement thereof and then to flow towards the outlet, and an escape port in the reservoir communicating with the outlet, the arrangement being one in which pressure air engages the piston to urge material out through the port subsequently to be entrained in the fluid stream leaving the device.

Further according to the invention the reservoir is in the nature of a cartridge having the piston acting as a stopper at one end and a small discharge port at the remote end, the port preferably being closed with a suitable cap when not in use. In use the cap is removed from the port so that grease or the like may escape.

Still further according to the invention the inlet to the chamber is defined by a removable cap member coaxial with the chamber, and adapted to provide access to the latter for insertion and removal of the cartridge.

Also according to the invention locating formations are provided towards the inlet and outlet of the chamber, to space the cartridge from the inner walls of the chamber so that an air passage communicating between inlet and outlet is defined between the cartridge and such inner walls.

Yet further according to the invention the locating formation at the outlet of the chamber is an inward extension of the outlet, adapted to receive the cartridge discharge port in spigot and socket fashion, the extension being profiled or perforated to permit the passage of air therethrough.

Further still according to the invention the locating formation at the chamber inlet is defined by the removable cap member, the locating formation being in the nature of an inward projection, profiled or perforated to permit the passage of air therethrough, and adapted to receive the rear of the cartridge in spigot and socket fashion.

Preferably the cap member is maintained in position on the casing by means of a spring clip or the like.

Also included within the scope of this invention is a casing and a cartridge suitable for use in the lubricator, both as disclosed herein.

In order to illustrate the device of the invention an example is described hereunder with reference to the accompanying drawing which is a longitudinal section of a lubricator loaded with a grease cartridge.

Referring to the drawing, the device includes a tubular metal casing 2 closed at its inlet end 3 by cap 4 and having at its outlet end 5 a threaded socket 6 which projects into the interior of chamber 7. The cap 4 and the socket 6 provide locating elements for the positioning of a grease cartridge 8 in the chamber 7 in the manner shown in the FIGURE. The locating formations are profiled or perforated to permit the passage of air therethrough.

Cap 4 is held in position in casing 2 by means of a spring clip arrangement 9 which facilitates the removal and replacement of the grease cartridge.

Grease cartridge 8 in the arrangement of the embodiment is characterised in an end 10 which defines an outlet port 11 closed with the aid of a disposable hood or cap 12. In use the hood 12 will be removed and it is merely shown in the FIGURE to indicate the position where a loaded air line lubricator is prepared for transportation to the site where it will be used. Before coupling into an air line the hood is taken off to expose the port.

At the end 13 of the grease reservoir or cartridge 8 is a piston arrangement 14 which is located in the mouth of the cartridge, while provision is made for pressure air not only to impinge on the back of the piston but to escape down the sides of the cartridge in the direction shown by arrows 15 towards the outlet 5.

The embodiment illustrated is principally intended for use as an air line lubricator in relation to rock drills and the like. The device is screwed into the pressure air line and when pressure air flows through the device the piston is caused to move slowly under the influence of the pressure air towards the port 11. During the course of this movement small quantities of grease are constantly being discharged into the air stream so that the grease is carried away in the stream towards the rock drill. The discharge port 11 is directed, as shown, towards a socket 6 which forms the outlet of the casing 2, and the moving stream of gas flows in the chamber 7 around the concentrically positioned reservoir 8 and thence between socket 6 and discharge port 11.

Many different embodiments of the invention exist differing from each other in matters of detail only. The invention is directed to the unit including the reservoir as a fixture therein but principally to a unit in which the reservoir is a removable cartridge. Coverage is also sought for the casing adapted to accommodate the cartridge and also to the cartridge itself adapted for insertion in the casing. In respect of the cartridge its characterising feature is a sleeve terminating at one end in a discharge port and providing at its remote end a piston arrangement by means of which material in the sleeve may be discharged through the port. Disposable cartridges preferably of a suitable synthetic resinous material are very much in the contemplation of the applicant.

It will be appreciated that the terms "pressure air" and "grease" and the like are used in a general sense to cover other possibilities. For instance, it is conceivable that a gas other than air may be involved and a material other than grease may be the dosant. The essential requirements are that a pressure fluid be present to operate the piston arrangement in the cartridge and a material be located in the cartridge which may be expelled on movement of the piston to become entrained in the fluid stream.

I claim:

1. A lubricator for an air line comprising:

a tubular casing defining a chamber therein, said casing having a first open end, and a second end opposite said first end, a removable cap member operatively connected to said casing at said first end and including an axial passage therethrough for permitting passage of air from an air line connected to said cap member into said chamber, said cap member comprising first socket means extending into said chamber, means defining an outlet from said chamber located at the said second end, said outlet defining means comprising second socket means extending into said chamber, a removable reservoir in said chamber containing viscous material, and having a first end in said first socket means, said reservoir first end having piston means therewithin facing towards said axial passage in said removable cap member for impingement of air thereon to move said piston means into said reservoir away from said reservoir first end, said reservoir having a second end comprising spout means extending into said second socket means and comprising an outlet port, said socket means comprising means for receiving and releasably supporting said reservoir in spaced relation to the inner walls of said chamber, and further comprising means permitting the passage of air therethrough when said reservoir is in place in said socket means, whereby said cap may be removed and said reservoir introduced into said chamber, and air will flow through said passage in said cap, impinge on and urge said piston means away from said first ends, flow through said first socket means, around said reservoir and thence through said second socket means, past said reservoir outlet port, entraining small quantities of viscous material from said reservoir, and thence pass out said outlet of said casing.

2. The lubricator of claim 1, and spring clip means for releasably securing said cap member to said first end of said casing.

* * * * *